US012756280B2

(12) United States Patent
Murakawa

(10) Patent No.: US 12,756,280 B2
(45) Date of Patent: Oct. 6, 2026

(54) MANUFACTURING APPARATUS OF LAMINATED IRON CORE

(71) Applicant: NIPPON STEEL CORPORATION, Tokyo (JP)

(72) Inventor: Tesshu Murakawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/880,212

(22) PCT Filed: Aug. 18, 2023

(86) PCT No.: PCT/JP2023/029881
§ 371 (c)(1),
(2) Date: Dec. 30, 2024

(87) PCT Pub. No.: WO2024/053364
PCT Pub. Date: Mar. 14, 2024

(65) Prior Publication Data

US 2025/0167644 A1 May 22, 2025

(30) Foreign Application Priority Data

Sep. 8, 2022 (JP) ................................ 2022-142853

(51) Int. Cl.
*H02K 15/0273* (2025.01)
*H02K 15/121* (2025.01)

(52) U.S. Cl.
CPC ....... *H02K 15/0273* (2025.01); *H02K 15/121* (2025.01); *H02K 2215/00* (2021.08)

(58) Field of Classification Search
CPC ........ B21D 28/22; B21D 39/03; H02K 15/02; H02K 15/026; H01F 1/18
(Continued)

(56) References Cited

U.S. PATENT DOCUMENTS 6,484,387 B1 * 11/2002 Lee ........................ H02K 15/02 29/609
7,600,312 B2 * 10/2009 Lee ........................ B21D 35/00 29/736
(Continued)

FOREIGN PATENT DOCUMENTS

AT 512931 B1 * 12/2013 ........... B32B 23/042
CN 113228479 A 8/2021
(Continued)

*Primary Examiner* — Minh N Trinh
(74) *Attorney, Agent, or Firm* — Birch, Stewart, Kolasch & Birch, LLP

(57) ABSTRACT

A manufacturing apparatus of a laminated iron core includes a progressive die, that presses an electrical steel sheet having a coating containing an adhesive that exhibits adhesive ability through heating, provided to a sheet surface thereof, to obtain a unit iron core; a lamination space in which the unit iron cores after being subjected to a final pressing step in the progressive die are laminated; and a heating unit that is disposed at an upper part of the lamination space and that heats the sheet surface of the unit iron core of an uppermost layer laminated in the lamination space, at a plurality of partial regions to make the unit iron core of the uppermost layer to be partially adhered to the unit iron core of a lower layer thereof at a plurality of regions.

2 Claims, 2 Drawing Sheets

(58) Field of Classification Search
USPC .............................................................. 29/732
See application file for complete search history.

(56) References Cited

U.S. PATENT DOCUMENTS

| | | | | |
|---|---|---|---|---|
| 2022/0037939 | A1 | 2/2022 | Takeda et al. | |
| 2022/0220593 | A1 | 7/2022 | Lewe et al. | |
| 2023/0119661 | A1* | 4/2023 | Lewe | H02K 15/02 310/216.065 |
| 2023/0253140 | A1* | 8/2023 | Takeda | C09J 11/04 29/607 |

FOREIGN PATENT DOCUMENTS

| | | | | |
|---|---|---|---|---|
| DE | 10 2012 001 744 | A1 | | 8/2013 |
| DE | 10 2016 225 853 | A1 | | 6/2018 |
| DE | 10 2020 109 985 | A1 | | 10/2021 |
| JP | 10261535 | A | * | 9/1998 |
| JP | 2002-151335 | A | | 5/2002 |
| JP | 3745490 | B2 | | 2/2006 |
| JP | 6466962 | B2 | | 1/2019 |
| JP | 2022-888 | A | | 1/2022 |
| JP | 2022-533045 | A | | 7/2022 |

* cited by examiner

MANUFACTURING APPARATUS OF LAMINATED IRON CORE

TECHNICAL FIELD

The present invention relates to a manufacturing method of a laminated iron core, a manufacturing apparatus of a laminated iron core, a laminated iron core, and a rotary electric machine. This application is based upon and claims the benefit of priority of the prior Japanese Patent Application No. 2022-142853, filed on Sep. 8, 2022, the entire contents of which are incorporated herein by reference.

BACKGROUND ART

As an iron core (core) used for a motor, a transformer, and the like, there is used a laminated iron core. The laminated iron core is an iron core obtained by laminating thin steel sheets whose surfaces are subjected to insulation treatment, and exhibits an effect of reducing a loss caused by an eddy current.

Patent Literature 1 discloses a laminated iron core in which lamination surfaces of unit iron cores are partially fixed at the lamination surfaces. Since the fixing portions are partially provided, it is possible to improve a core loss property.

Further, Patent Literature 2 discloses that, when manufacturing a core by laminating electrical steel sheets each having a coating that exhibits adhesive ability when its surface is heated, provided to a surface thereof, mainly the coatings are heated by a local heating unit after the electrical steel sheets are worked and right before they are laminated, to make the adhesive ability of the coatings to be exhibited, thereby making the laminated electrical steel sheets to be entirely or partially adhered to each other to form the integrated core.

CITATION LIST

Patent Literature

Patent Literature 1: Japanese Laid-open Patent Publication No. 2002-151335

Patent Literature 2: Japanese Patent No. 3745490

SUMMARY OF INVENTION

Technical Problem

In the manufacturing method in Patent Literature 2, a core material punched by a press machine is conveyed to a heating position at which heating is performed by an infrared heating machine, in a state of being magnetically attracted to a cylinder of the press machine, and then conveyed to a lamination position.

As described above, there is a need to move the core material to the heating position and the lamination position, and thus it cannot be said that it is efficient.

Further, since the core material is heated in the state of being magnetically attracted to the cylinder of the press machine, when the coating is formed on the entire surface of the core material, there is a possibility that the core material is adhered to the cylinder of the press machine. Accordingly, there is a chance that the core material cannot be properly laminated at the lamination position, and further, a repair of the press machine is sometimes required, and based on that point as well, it cannot be said that it is efficient.

The present invention has been made in view of the problems as described above, and an object thereof is to increase efficiency of manufacture of a laminated iron core.

Solution to Problem

A manufacturing method of a laminated iron core of the present invention is characterized in that it includes: a step of pressing, with a die, an electrical steel sheet having a coating containing an adhesive that exhibits adhesive ability through heating, provided to a sheet surface thereof, to obtain a unit iron core; and a step of laminating the unit iron cores pressed with the die, and heating the sheet surface of the unit iron core of an uppermost layer at a plurality of partial regions to make the unit iron core of the uppermost layer to be partially adhered to the unit iron core of a lower layer thereof at a plurality of regions.

A manufacturing apparatus of a laminated iron core of the present invention is characterized in that it includes: a progressive die that presses an electrical steel sheet having a coating containing an adhesive that exhibits adhesive ability through heating, provided to a sheet surface thereof, to obtain a unit iron core; a lamination space in which the unit iron cores after being subjected to a final pressing step in the progressive die are laminated; and a heating unit that is disposed at an upper part of the lamination space and that heats the sheet surface of the unit iron core of an uppermost layer laminated in the lamination space, at a plurality of partial regions.

A laminated iron core of the present invention is characterized in that it is manufactured through a step of pressing, with a die, an electrical steel sheet having a coating containing an adhesive that exhibits adhesive ability through heating, provided to a sheet surface thereof, to obtain a unit iron core, and a step of laminating the unit iron cores pressed with the die, and heating the sheet surface of the unit iron core of an uppermost layer at a plurality of partial regions to make the unit iron core of the uppermost layer to be partially adhered to the unit iron core of a lower layer thereof at a plurality of regions.

A rotary electric machine of the present invention is characterized in that it includes the laminated iron core.

Advantageous Effects of Invention

According to the present invention, it is possible to increase efficiency of manufacture of a laminated iron core.

DESCRIPTION OF EMBODIMENTS

Hereinafter, preferred embodiments of the present invention will be explained while referring to the attached drawings.

A manufacturing method and a manufacturing apparatus of a laminated iron core according to an embodiment will be explained while referring to FIG. 1A to FIG. 1C. The laminated iron core is an iron core obtained by laminating thin steel sheets whose surfaces are subjected to insulation treatment (referred to as "unit iron cores" in the present application).

A manufacturing apparatus of a laminated iron core according to an embodiment includes a progressive die 2 that presses an electrical steel sheet to obtain a unit iron core 1, and a lamination space 3 in which the unit iron cores 1 after being subjected to a final pressing step in the progressive die 2 are laminated.

Figure 1A:
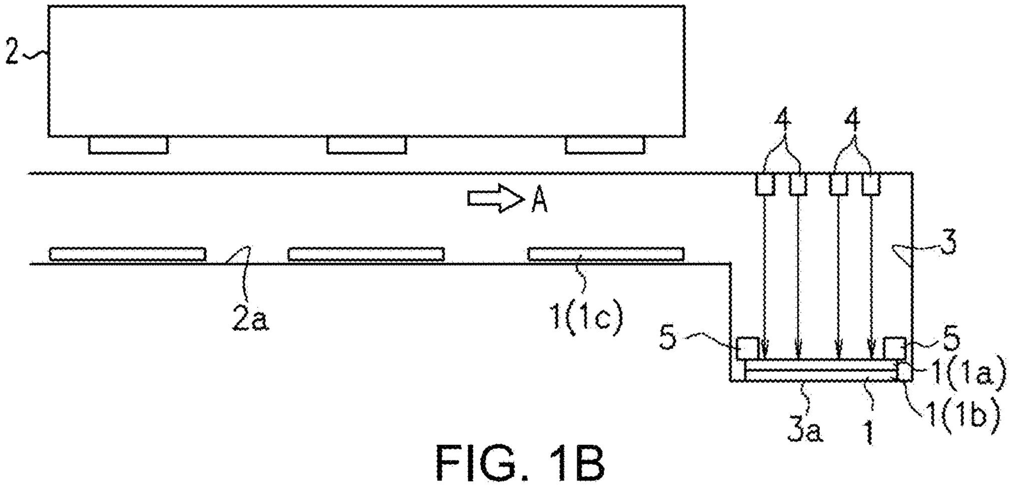
FIG. 1A is a view for explaining a manufacturing method and a manufacturing apparatus of a laminated iron core according to an embodiment.
Figure 1B:
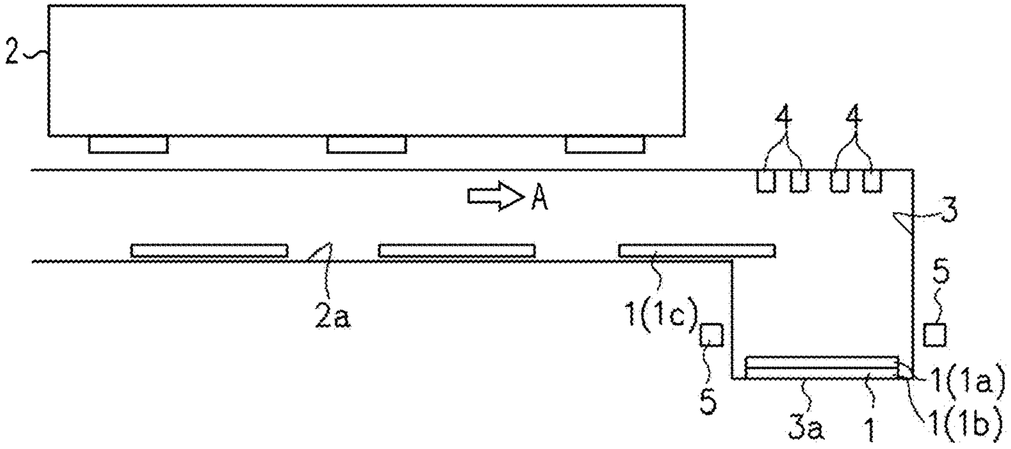
FIG. 1B is a view for explaining the manufacturing method and the manufacturing apparatus of the laminated iron core according to the embodiment.
Figure 1C:
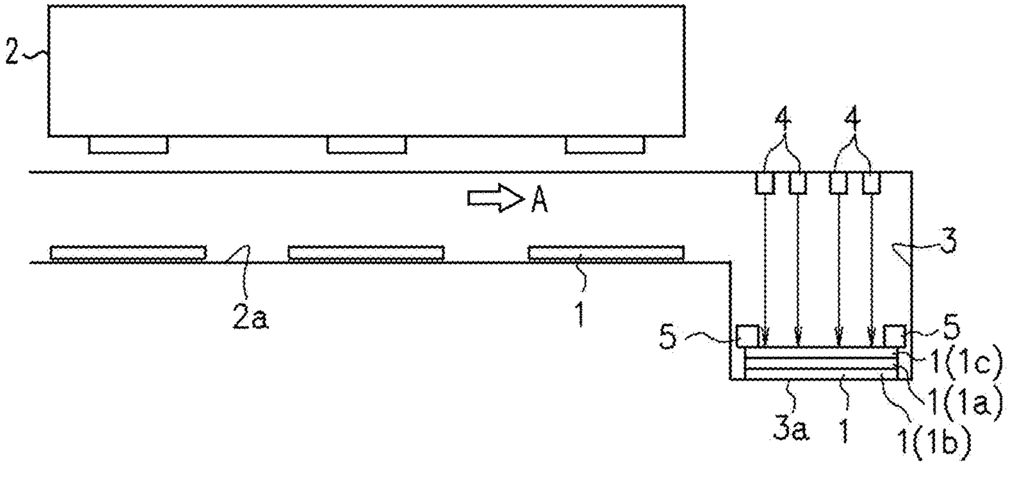
FIG. 1C is a view for explaining the manufacturing method and the manufacturing apparatus of the laminated iron core according to the embodiment.

Although illustrated simply in FIG. 1A to FIG. 1C, the progressive die 2 is a die in which a plurality of pressing steps can be performed, and pressing is performed in sequence while automatically feeding a material to the next step every one shot, as indicated by an arrow mark A in the drawings. Accordingly, it is possible to punch the electrical steel sheet little by little to form the unit iron core 1 having a complicated shape. The unit iron core 1 after being subjected to the final pressing step in the progressive die 2 has a thin disk shape punched into a predetermined shape (for example, a ring shape having predetermined outside diameter and inside diameter) (refer to Patent Literature 1, and so on).

A coating containing an adhesive that exhibits adhesive ability through heating is performed on the electrical steel sheet to be the material of the unit iron core 1, and thus a coating containing the adhesive is provided to the electrical steel sheet, at the stage where the electrical steel sheet is put in the progressive die 2. It is only required to design that the coating containing the adhesive is already provided to the electrical steel sheet wound in a state of coil, shipped from a manufacturer, for example.

For the purpose of realizing not only securement of insulation performance but also suppression of rust generation, and the like, an insulating coating is generally provided to a sheet surface of an electrical steel sheet. For example, the coating containing the adhesive may also be this insulating coating in which the adhesive is contained. Further, a coating containing the adhesive may also be provided, separately from the insulating coating. The coating containing the adhesive includes a coating formed only of the adhesive, and it may also be formed by coating the adhesive onto the insulating coating, for example. Note that the coating containing the adhesive may also be formed by partially coating the adhesive onto the insulating coating.

The coating containing the adhesive is preferably provided to a front surface and a rear surface being two sheet surfaces of the unit iron core 1. This is because, since there exist the coatings on two sheet surfaces that face each other when the unit iron cores 1 are laminated, the unit iron cores 1 can be adhered to each other more securely. However, it is only required that the coating exists on an entire sheet surface of at least one of the two sheet surfaces that face each other when the unit iron cores 1 are laminated. Therefore, the coating may also be formed only on one sheet surface out of the two sheet surfaces of the unit iron core 1. Note that the coating is preferably formed so as to cover the entire area of the sheet surface of the unit iron core 1, but it may also be formed on an area of 50% or more of the entire area of the sheet surface of the unit iron core 1, and it may also be formed on an area of 70% or more, or 90% or more of the entire area.

The coating changes, when it exhibits the adhesive ability, from a state where an adherend (the unit iron core 1, in the present embodiment) cannot be adhered to the coating to a state where the adherend can be adhered to the coating. Therefore, the state of the coating changes, through heating, from a state where the coating cannot be adhered to the adherend to a state where the coating can be adhered to the adherend. It is possible to check whether or not the adhesive ability is exhibited, by the following method, for example.

First, from an electrical steel sheet having a configuration same as that of the electrical steel sheet used for the unit iron core 1, two rectangular electrical steel sheets are cut out. At this time, the coating formed on the entire sheet surface of each of the two electrical steel sheets, is in a state where the adhesive ability is not exhibited (specifically, in a state of not being heated). Further, a size of each of the two electrical steel sheets is 30 mm in width and 60 mm in length. The sheet surfaces of tip portions of such two electrical steel sheets are overlapped to each other. A size of an overlapped region (the sheet surfaces of the tip portions) is 30 mm in width and 10 mm in length. The two electrical steel sheets in which the sheet surfaces of the tip portions are overlapped to each other, are adhered under a condition including a steel sheet temperature of 180° C., a pressure of 10 MPa, and a pressurization time of one hour. Note that the steel sheet temperature (=180° C.) differs depending on a component and the like of the coating. The steel sheet temperature is set to be equal to or more than a temperature that is previously determined as a temperature at which the coating exhibits the adhesive ability. The two electrical steel sheets adhered as above, are used as a test piece. Shearing tensile strength of the test piece is measured under a condition including an atmospheric temperature of 25° C., and a tensile rate of 3 mm/minute. A numeric value obtained by dividing the shearing tensile strength by an adhesion area (=300 $mm^2$) is calculated as adhesive strength (MPa). When the adhesive strength is 2.5 MPa or more, it can be determined that the adhesive ability is exhibited.

Further, it is also possible that the electrical steel sheet is collected from the laminated iron core, and the collected electrical steel sheet is used to produce a test piece having a configuration same as that of the above-described test piece. In this case, when the adhesive strength of the test piece is 2.5 MPa or more, it can be determined that the adhesive ability is exhibited in the laminated iron core. Note that when the adhesive strength of the test piece is 2.5 MPa or more, this corresponds to the fact that the adhesive strength of the electrical steel sheet in the laminated iron core is 2.5 MPa or more.

The adhesive contained in the coating is not limited to a specific adhesive. For example, various kinds of adhesive such as an acrylic resin adhesive, a cyanoacrylate-based adhesive, an epoxy resin adhesive, a polyester adhesive, a polyurethane adhesive, a melamine resin adhesive, and a phenol resin adhesive, may also be used. As an example that is further suitable as the adhesive, there can be cited a thermosetting organic resin adhesive whose chemical reaction proceeds through heating. Concretely, an adhesive containing one kind or two kinds or more of resins such as an epoxy resin, a phenol resin, a urethane resin, and a melamine resin, as a main component, may also be used. Further, it is also possible to use a polyester resin and/or an acrylic resin and the like to which a crosslinking agent is added to give a thermosetting property thereto. Further, it is also possible to use an inorganic adhesive in which a dehydration condensation reaction proceeds through heating to cause curing.

Further, the adhesive contained in the coating may also be an anaerobic adhesive. In this case, the adhesive contained in the coating exhibits the adhesive ability through heating and blocking of air. Therefore, it is designed that when the coating and the adherend are adhered to each other, a space is prevented from being generated between the coating and the adherend. For example, it is also possible that an adhesive layer is formed on the coating such as the insulating coating, and then heating and pressing of the coating and the adhesive layer are performed, to thereby form the coating containing the adhesive.

The lamination space 3 is arranged so as to be adjacent to a position of the final pressing step in the progressive die 2. The lamination space 3 has a bottom surface 3*a* at a position lower than a conveyance path 2*a* of the progressive die 2, for example, and it is configured that the unit iron cores 1 after being subjected to the final pressing step are dropped via a not-illustrated guide, to be laminated one after another. The unit iron cores 1 subjected to the final pressing step in the progressive die 2 and then conveyed in sequence to the lamination space 3 are in the same direction, so that the unit iron cores 1 are laminated by being dropped in the lamination space 3 without changing the direction.

At an upper part of the lamination space 3, a plurality of laser oscillators 4 are disposed. The respective laser oscillators 4 irradiate partial regions of the unit iron core 1 of an uppermost layer laminated in the lamination space 3 (a unit iron core 1*a* in FIG. 1A, and a unit iron core 1*c* in FIG. 1C) with laser beams, to thereby partially heat the unit iron core 1. When using the laser beam, the partial heating means heating of a partial region of a sheet surface of the unit iron core 1. Concretely, it is possible to define that a region physically irradiated with the laser beam on the unit iron core 1 is a partial region of the entire area of the sheet surface of the unit iron core 1. These plurality of laser oscillators 4 function as a heating unit that heats the sheet surface of the unit iron core 1 at a plurality of partial regions. Two or more of regions out of these plurality of partial regions are set to be at positions separated from each other. Note that the present embodiment exemplifies a case where all of a plurality of partial regions to be heated are at positions separated from each other. However, the plurality of partial regions to be heated may also include two or more of regions that are not separated from each other.

Here, the heating means that the unit iron core 1 is heated to a temperature equal to or more than a temperature at which the adhesive ability of the coating containing the adhesive formed on the sheet surface of the unit iron core 1 is exhibited. The temperature at which the adhesive ability of the coating containing the adhesive is exhibited is determined by a specification of the coating presented by a manufacturer of the coating or the adhesive, for example. Further, a shape of the region irradiated with the laser beam on the sheet surface of the unit iron core 1, can be set to a point shape, for example. By using the laser heating, it is possible to heat the unit iron core 1 at a pin-point, and only the coating formed at a portion corresponding to the region to be heated of the unit iron core 1 exhibits the adhesive ability, resulting in that the unit iron cores 1 can be partially adhered to each other at a plurality of regions, in a point manner, respectively. By making the unit iron cores 1 to be partially adhered to each other at the plurality of regions, it is possible to reduce a compressive stress applied to the unit iron cores 1 to improve a core loss property of the laminated iron core. Further, by making the unit iron cores 1 to be partially adhered to each other at the plurality of regions, it is possible to reduce a risk that the adhesion (fixing) of the unit iron cores 1 becomes insufficient. Note that although the example of using the laser oscillators 4 is adopted, it is also possible to use another heating unit. Another heating unit includes, for example, induction heating (IH), a halogen lamp, blowing of hot air, and the like, and any of the units may be selected. Also in a case of using these heating units, it is possible to partially heat the unit iron core 1 by heating only the partial regions of the sheet surface of the unit iron core 1.

Note that when heating the unit iron core 1, it is possible to adjust laser beam intensity and the like so that only one laminated unit iron core 1 of the uppermost layer is heated. In this case, it is also possible to design that out of the laminated plurality of unit iron cores 1, the unit iron cores 1 except for the unit iron core 1 of the uppermost layer are not heated, so that only the unit iron core 1 of the uppermost layer and one unit iron core 1 right under the uppermost layer (one layer under the uppermost layer) are adhered to each other and the other unit iron cores 1 are not adhered to each other. When only the unit iron core 1 of the uppermost layer is heated, a part of the coating formed between the unit iron core 1 of the uppermost layer and the unit iron core 1 right under it is heated, and the adhesive ability is exhibited. Further, the unit iron core 1 of the uppermost layer and the unit iron core 1 right under it are partially adhered. By repeating this every time the unit iron core 1 of the uppermost layer is laminated, it is possible to surely secure the adhesive strength of the laminated iron core with no variation.

From a viewpoint of realizing both the reduction in the compressive stress that is applied to the electrical steel sheets, and the reduction in risk that the adhesion (fixing) of the electrical steel sheets becomes insufficient, the number of regions to be heated at the sheet surface of the unit iron core may be set to 0.3×Nt or more and 6.0×Nt or less, it is preferably set to 0.4×Nt or more and 4.0×Nt or less, and it is more preferably set to 0.5×Nt or more and 2.0×Nt or less, when the number of teeth of a stator core is set to Nt (in a case of a rotor core, the number of teeth of a stator core to be paired with the rotor core is set to Nt), for example. The number of regions to be heated may also be set to, for example, three or more or four or more, and further, it may also be set to six or more or twelve or more. A ratio of a total area of the regions to be heated at one sheet surface of the electrical steel sheet 10 to an area of the one sheet surface is preferably set to 5% or more and 70% or less, and more preferably set to 10% or more and 50% or less, for example. For example, it is also possible to design such that at least one region to be heated exists in each of a plurality of divided regions obtained by dividing a region of one sheet surface of the electrical steel sheet 10 into two or more and twenty or less, or three or more and twenty or less so that each region has the same area. Note that the region to be heated indicates a region of the unit iron core to be heated to a temperature equal to or more than the temperature at which the adhesive ability of the coating containing the adhesive formed on the sheet surface of the unit iron core is exhibited, and is a region irradiated with the laser beam on the sheet surface of the unit iron core, for example. Further, in the region to be heated, the sheet surface of the unit iron core to be heated and the sheet surface of the unit iron core adjacent to the unit iron core to be heated in the lamination direction are adhered to each other. Accordingly, the number and the area of the regions to be heated preferably match the number and the area of the regions at which the sheet surfaces of the unit iron cores adjacent in the lamination direction are adhered to each other.

Further, at side portions of the lamination space 3, pressurizing parts 5 that function as a pressurizing unit that pressurizes the unit iron cores 1 laminated in the lamination space 3 are disposed. The pressurizing parts 5 are configured in a vertically movable manner with respect to the lamination space 3 and in a retractable manner from the lamination space 3. The pressurizing parts 5 perform pressurization so as to press against an upper surface of the unit iron core 1 of the uppermost layer (the unit iron core 1*a* in FIG. 1A, and the unit iron core 1*c* in FIG. 1C) laminated in the lamination space 3.

Hereinafter, a manufacturing method of a laminated iron core according to an embodiment will be explained.

As illustrated in FIG. 1A, when, in a state where one unit iron core 1*b* after being subjected to the final pressing step in the progressive die 2 is in the lamination space 3, one unit iron core 1*a* after being subjected to the final pressing step in the progressive die 2 is laminated, partial regions of a sheet surface of the unit iron core 1*a* of the uppermost layer are irradiated with laser beams from the laser oscillators 4 to partially heat the unit iron core 1*a* at a plurality of regions, resulting in that partial regions of the coating between the unit iron core 1*a* and the unit iron core 1*b* of a lower layer thereof exhibit the adhesive ability, and the unit iron core 1*a* is adhered, in a point manner, to the unit iron core 1*b* at the plurality of regions. By using the anaerobic adhesive, the adhesive ability is exhibited between a lower surface of the unit iron core 1*a* and an upper surface of the unit iron core 1*b* at which the air is blocked. Note that at a point of time where the unit iron core 1*a* is laminated and before it is heated, a temperature of the unit iron core 1*a* does not become a temperature equal to or more than the temperature at which the adhesive ability of the coating is exhibited, and thus the adhesive ability of the coating is not exhibited.

At this time, by performing the pressurization, with the pressurizing parts 5, so as to press against the upper surface of the unit iron core 1*a* of the uppermost layer, it is possible to increase the adhesive strength between the unit iron cores 1 by preventing a gap from being generated between the unit iron core 1*a* and the unit iron core 1*b*.

Next, as illustrated in FIG. 1B, the irradiation of laser beams by the laser oscillators 4 is stopped, and the pressurizing parts 5 are retracted from the lamination space 3, to wait for the lamination of the next one unit iron core 1*c* after being subjected to the final pressing step in the progressive die 2.

After the lamination of the next one unit iron core 1*c*, as illustrated in FIG. 1C, partial regions of a sheet surface of the unit iron core 1*c* of the uppermost layer are irradiated with laser beams from the laser oscillators 4 to partially heat the unit iron core 1*c*, resulting in that partial regions of the coating between the unit iron core 1*c* and the unit iron core 1*a* of a lower layer thereof exhibit the adhesive ability, and the unit iron core 1*c* is adhered, in a point manner, to the unit iron core 1*a* at the plurality of regions. By using the anaerobic adhesive, the adhesive ability is exhibited between a lower surface of the unit iron core 1*c* and the upper surface of the unit iron core 1*a* at which the air is blocked. Note that at a point of time where the unit iron core 1*c* is laminated and before it is heated, a temperature of the unit iron core 1*c* does not become a temperature equal to or more than the temperature at which the adhesive ability of the coating is exhibited, and thus the adhesive ability of the coating is not exhibited.

At this time, by performing the pressurization, with the pressurizing parts 5, so as to press against the upper surface of the unit iron core 1*c* of the uppermost layer, it is possible to increase the adhesive strength between the unit iron cores 1 by preventing a gap from being generated between the unit iron core 1*c* and the unit iron core 1*a*.

Further, since the heating and pressurization of the unit iron cores 1 laminated in the lamination space 3 are performed, the lamination, and the heating and pressurization are performed at the same position.

By repeating such steps illustrated in FIG. 1A to FIG. 1C by the number of required unit iron cores 1, it is possible to complete the laminated iron core.

As described above, the pressing of the electrical steel sheet using the progressive die 2 to obtain the unit iron core 1, and the lamination of this unit iron core 1, can be performed substantially simultaneously as a series of operation. Further, since it is designed that the heating is performed in the lamination space 3 after the lamination, the lamination position and the heating position can be set to the same position, and thus there is no need to move the unit iron core 1 between the positions. Besides, the heating is designed to be performed after the lamination, so that there is no chance that the unit iron core 1 is heated in the die and adhered to the die.

As described above, by performing the presswork and the lamination substantially simultaneously as a series of operation, it is possible to increase the efficiency of manufacture of the laminated iron core without increasing the man-hour.

Note that when the lamination position and the heating position are the same position, this means not only a case where they are strictly the same position but also a case where the lamination position and the heating position are substantially the same position. When the lamination position and the heating position are substantially the same position, this means that, for example, in the lamination space 3, the laminated unit iron core 1 is heated while its position is displaced from the lamination position by a distance of ½ or less a width of the unit iron core 1.

Note that in the present embodiment, the heating of the unit iron core 1 of the uppermost layer is repeated every time one unit iron core 1 is laminated, but it is also possible to repeat the heating of the unit iron core 1 of the uppermost layer every time a predetermined plurality of unit iron cores 1 are laminated. If the number of unit iron cores 1 required for completing the laminated iron core is set to N, the number of the predetermined plurality of unit iron cores is preferably set to half or less the number (N/2 or less). Further, the laser beam intensity is set so that when the unit iron core of the uppermost layer is heated, one or more of unit iron cores of a lower layer thereof can be simultaneously heated to a temperature equal to or more than the temperature at which the coating exhibits the adhesive ability. By simultaneously heating the plurality of unit iron cores including the unit iron core of the uppermost layer, the coatings formed on the sheet surfaces of the plurality of unit iron cores respectively exhibit the adhesive ability, and the plurality of unit iron cores can be collectively adhered to each other. Accordingly, it is possible to efficiently manufacture the laminated iron core. However, when the unit iron core 1 of the uppermost layer is heated every time a plurality of, for example, two unit iron cores 1 are laminated, there is a need to make the two unit iron cores 1 laminated this time to be adhered to each other, and to make the above unit iron cores 1 to be adhered to the unit iron core 1 that has already existed in the lamination space 3 before the lamination this time. For this reason, there is a need to increase the laser beam intensity, and further, there is a possibility that the temperature becomes difficult to be increased toward the lower layer, and a variation in adhesive strength occurs between layers. With respect to this, when the unit iron core 1 of the uppermost layer is heated every time one unit iron core 1 is laminated, as in the present embodiment, it is possible to prevent the occurrence of variation in the adhesive strength between layers.

Further, as illustrated in FIG. 1A and FIG. 1C, it is designed that the pressurization is performed by the pressurizing parts 5 during the irradiation of laser beams. By performing the pressurization during the irradiation of laser beams as above, it is possible to increase the adhesion accuracy. However, it is not limited to this, and it is also possible to perform the pressurization at a timing before or after the irradiation of laser beams, for example.

Further, it is also possible to adopt a configuration in which the height of the bottom surface 3*a* of the lamination space 3 is variable. In this case, by lowering the bottom surface 3*a* in accordance with the increase in the number of unit iron cores 1 to be laminated, the height position of the unit iron core 1 of the uppermost layer can be kept substantially constant. This eliminates the necessity of vertically moving the pressurizing parts 5 in accordance with the height of the unit iron core 1 of the uppermost layer. Further, a distance between the laser oscillators 4 and the unit iron core 1 of the uppermost layer can be kept constant, and if the laser beam intensity is set to be constant, it is possible to achieve a constant heating effect.

Figure 2:
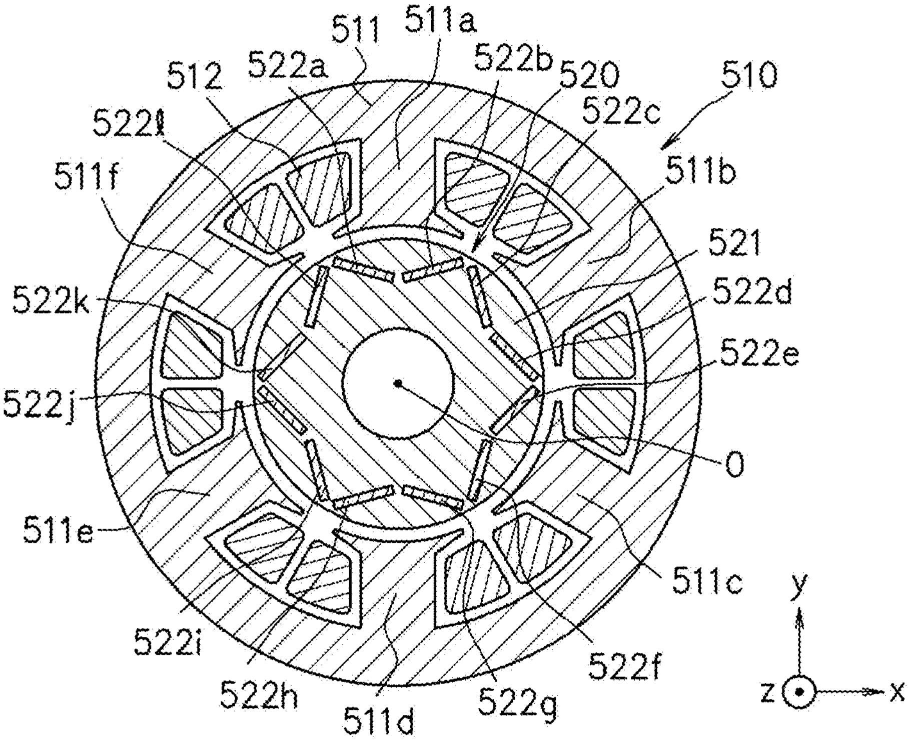
FIG. 2 is a view illustrating one example of a rotary electric machine.

FIG. 2 is a view illustrating one example of a configuration of equipment having the laminated iron core manufactured by using the manufacturing method of the laminated iron core of the present embodiment. FIG. 2 exemplifies a case where the equipment is a rotary electric machine. Further, FIG. 2 illustrates a cross section of the rotary electric machine when the rotary electric machine is cut perpendicular to its center line 0. An x-y plane direction is a sheet surface direction of the unit iron core.

In FIG. 2, the rotary electric machine has a stator 510 and a rotor 520. The stator 510 has a stator core 511 and a stator coil 512. The rotor 520 has a rotor core 521 and permanent magnets 522*a* to 522*l*.

Both the stator core 511 and the rotor core 521 may also be the laminated iron cores manufactured by using the manufacturing method of the laminated iron core of the present embodiment, and only either of them may also be the laminated iron core manufactured by using the manufacturing method of the laminated iron core of the present embodiment.

FIG. 2 exemplifies a case where the stator core 511 has six teeth 511*a* to 511*f*. Note that as long as at least one of the stator core and the rotor core is manufactured by using the manufacturing method of the laminated iron core of the present embodiment, a configuration of an IPM motor is not limited to the configuration exemplified in FIG. 2. For example, a flux barrier may also be formed in the rotor core.

Further, FIG. 2 exemplifies a case where the rotary electric machine is the IPM (Interior Permanent Magnet) motor. However, the rotary electric machine is not limited to the IPM motor. For example, the rotary electric machine may also be a motor other than the IPM motor. Further, the rotary electric machine may also be a power generator.

Although the present invention has been explained together with the embodiments, the above-described embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

The invention claimed is:

1. A manufacturing apparatus of a laminated iron core, the laminated iron core including unit iron cores that are pressed from an electrical steel sheet having a coating containing an adhesive that exhibits adhesive ability through heating, provided to a sheet surface of the electrical steel sheet, and laminated, the manufacturing apparatus comprising:

a progressive die configured to press the electrical steel sheet having the coating containing the adhesive that exhibits adhesive ability through heating, provided to the sheet surface of the electrical steel sheet, to obtain a unit iron core, the electrical steel sheet being conveyed along a conveyor path, the progressive die disposed along the conveyor path;

a lamination space configured to laminate the unit iron cores after being subjected to a final pressing step in the progressive die, the lamination space disposed downstream from the progressive die along the conveyor path; and a heating unit that is disposed at an upper part of the lamination space and is configured to heat the sheet surface of the unit iron core of an uppermost layer laminated in the lamination space, at a plurality of partial regions to make the unit iron core of the uppermost layer to be partially adhered to the unit iron core of a lower layer thereof at a plurality of regions the heating unit disposed downstream from the progressive die along the conveyor path.

2. The manufacturing apparatus of the laminated iron core according to claim 1, further comprising a pressurizing unit configured to pressurize the unit iron cores laminated in the lamination space, wherein the pressurizing unit is configured in a retractable manner from the lamination space.

* * * * *